US012572630B2

(12) United States Patent
Santaus et al.

(10) Patent No.: US 12,572,630 B2
(45) Date of Patent: Mar. 10, 2026

(54) USER-TRUSTED EXECUTABLE EXECUTION ENVIRONMENT

(71) Applicant: Dell Products L.P., Round Rock, TX (US)

(72) Inventors: Benjamin Santaus, Somerville, MA (US); Seth Jacob Rothschild, Littleton, MA (US)

(73) Assignee: Dell Products L.P., Round Rock, TX (US)

( * ) Notice: Subject to any disclaimer, the term of this patent is extended or adjusted under 35 U.S.C. 154(b) by 630 days.

(21) Appl. No.: 17/812,816

(22) Filed: Jul. 15, 2022

(65) Prior Publication Data

US 2024/0020359 A1 Jan. 18, 2024

(51) Int. Cl.
| | |
|---|---|
| *H04L 29/06* | (2006.01) |
| *G06F 21/12* | (2013.01) |
| *G06F 21/44* | (2013.01) |
| *G06F 21/53* | (2013.01) |
| *H04L 9/32* | (2006.01) |

(52) U.S. Cl.
CPC .............. *G06F 21/12* (2013.01); *G06F 21/44* (2013.01); *G06F 21/53* (2013.01); *H04L 9/3263* (2013.01)

(58) Field of Classification Search
None
See application file for complete search history.

(56) References Cited

U.S. PATENT DOCUMENTS

| | | | | |
|---|---|---|---|---|
| 9,641,340 | B2 * | 5/2017 | Wang | H04L 63/0457 |
| 9,774,610 | B2 * | 9/2017 | Zheng | H04L 63/126 |
| 10,656,936 | B2 * | 5/2020 | Robison | G06F 9/44589 |
| 11,983,409 | B1 * | 5/2024 | Aiouaz | G06F 3/0659 |
| 12,267,437 | B2 * | 4/2025 | Kampanakis | H04L 9/50 |
| 2009/0031141 | A1 * | 1/2009 | Pearson | G06F 21/57 |
| | | | | 713/187 |
| 2013/0210519 | A1 * | 8/2013 | Gatto | A63F 13/12 |
| | | | | 463/29 |
| 2017/0034186 | A1 * | 2/2017 | Zheng | H04L 9/083 |

(Continued)

FOREIGN PATENT DOCUMENTS

| | | | | |
|---|---|---|---|---|
| AU | 2018217323 B2 * | 3/2020 | | G06F 21/552 |

OTHER PUBLICATIONS

Benton, Matthew. (2017). Epistemology Personalized. The Philosophical Quarterly. 67. 813-834. 10.1093/pq/pqx020. (Year: 2017).*

(Continued)

*Primary Examiner* — Jeffery L Williams
(74) *Attorney, Agent, or Firm* — Workman Nydegger

(57) ABSTRACT

A user-trusted executable execution environment is disclosed. Using a trusted application, an executable that is generally untrusted by a computing environment, can be verified and executed. A signed executable is signed by a sending trust engine and transmitted to a receiving trust engine. The receiving trust engine can verify the executable when a public key of a sending user decrypts the signed executable and when a hash generated by the receiving trust engine matches a hash of the executable included in the signed executable. The verification is finalized when the receiving user knows the sending user and confirms that the sending user sent the signed executable by using the sending user's public key to decrypt the signed executable.

14 Claims, 6 Drawing Sheets

(56)         References Cited

U.S. PATENT DOCUMENTS

| | | | | |
|---|---|---|---|---|
| 2019/0392115 A1* | 12/2019 | Yach | | H04W 4/60 |
| 2020/0073657 A1* | 3/2020 | Robison | | G06F 21/57 |
| 2021/0334358 A1* | 10/2021 | Medvinsky | | G06F 21/645 |
| 2023/0246845 A1* | 8/2023 | Peddada | | H04L 9/0894 |
| | | | | 713/176 |
| 2023/0254154 A1* | 8/2023 | Kampanakis | | H04L 9/3239 |
| | | | | 713/189 |
| 2023/0308289 A1* | 9/2023 | Yavuz | | H04L 9/3234 |
| 2024/0020359 A1* | 1/2024 | Santaus | | G06F 21/53 |

OTHER PUBLICATIONS

Benton, Matthew. (2017). Epistemology Personalized—Abstract. The Philosophical Quarterly. 67. 813-834. 10.1093/pq/pqx020. (Year: 2017).*

Hasan, Ali & Fumerton, Richard (2019). Knowledge by Acquaintance vs. Description. Stanford Encyclopedia of Philosophy. (Year: 2019).*

* cited by examiner

600

Storage Media
608

UI Device
610

Data Storage
612

Memory
602

NVRAM
604

Processor
606

Application(s)
614

USER-TRUSTED EXECUTABLE EXECUTION ENVIRONMENT

FIELD OF THE INVENTION

Embodiments of the present invention generally relate to executing code or executables. More particularly, at least some embodiments of the invention relate to systems, hardware, software, computer-readable media, and methods for executing user-trusted code.

BACKGROUND

Software development is often a collaborative task. A typical goal, when creating software, is to create software that can be shared and used. Software can be shared in different ways and one of the most convenient ways to share software is to create an executable. By compiling a program into an executable, the recipient of the executable does not need to install libraries or development tools. The executable can presumably be run as soon as the executable is loaded on the user's computer. However, many operating systems prevent unsigned, untrusted, or unknown executables from launching.

More specifically, deciding to run an executable received from another user is not without risk because the recipient cannot be sure of what actions the executable will perform on the user's device or system. As a result, running an executable without some type of verification that the executable was developed and distributed by a trusted source is risky.

Many operating systems have mechanisms that implement verification procedures that are configured to validate executables received from established or credentialed vendors. This typically requires the vendor to go through the process of obtaining and paying for a certificate issued by a certificate authority.

However, this places a burden on the developer or author of the executable. It may not be effective, in terms of cost and time, to seek a certificate for every application. Further, many developers write code that may have a specific purpose for a limited audience. For example, a worker may develop code that the worker would like to share with their coworkers to make some tasks easier or to solve a specific problem. In this situation, however, it may be difficult to get the coworkers' computers to trust the executable because the executable is not trusted by the recipient's computing device or system, even though these workers know each other personally.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
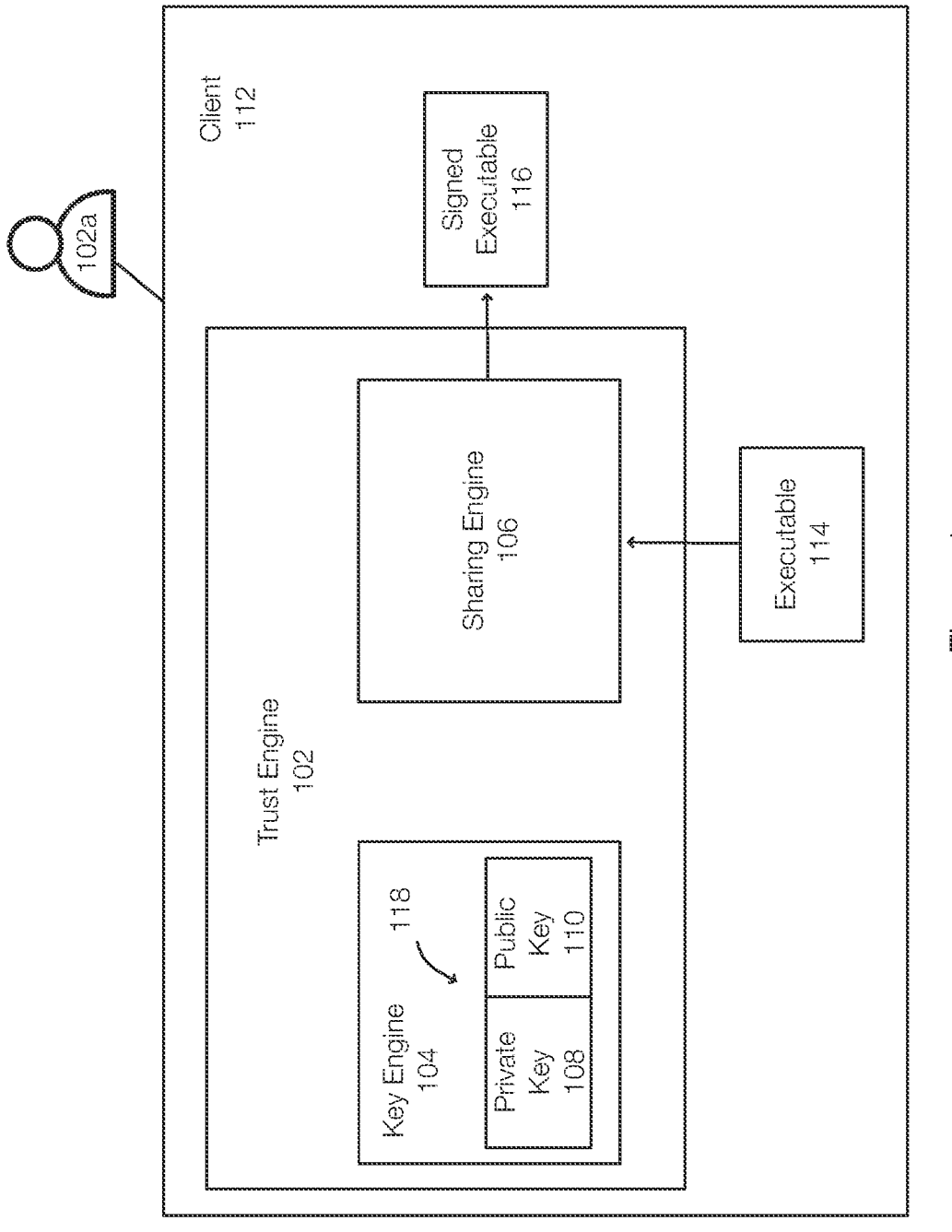
FIG. 1 discloses aspects of a trust engine.

Embodiments of the present invention generally relate to creating and distributing code, applications, or programs in various forms including as executables. More particularly, at least some embodiments of the invention relate to systems, hardware, software, computer-readable media, and methods for securely distributing, using, and/or maintaining code, applications, programs, or other executables.

Embodiments of the invention are discussed in the context of executables or executable files. Executables, as used herein, can refer to scripts, executables, complied code, binaries, macros, other executables or the like. Embodiments of the invention allow executables to be shared between users based in part on a personal connection between the sender (or executable author) and the recipient and/or using cryptography.

For example, embodiments of the invention allow a developer to share code or executables securely and in a trusted manner with their codevelopers. Executables are shared and verified based at least in part on human connections. Stated differently, these executables are user-trusted executables that are verified in part when the recipient knows the sender. A mechanism is provided that allows an operating system such as Windows to trust a proxy program or application such that the proxy program or application can interpret the executable as having come from a specific person and then execute the executable without a certificate or other conventional indications of trust.

By way of example, an executable file (executable) is a runnable application that has been complied into a single file for a specific computer architecture. Once compiled into an executable, from a practical perspective, the executable is not human readable. Rather, the executable is, as the name implies, able to be executed. The format of an executable, using a series of 1s and 0s makes it difficult to detect malicious code if present. For this reason, many operating systems have procedures to validate the origin and/or author of executables. These procedures may include checking the certificate. Depending on the settings, an operating system may prevent a user from running an executable that cannot be sufficiently verified or that does not have a valid certificate.

Embodiments of the invention allow executables to be verified and executed using a digital signature. The author of an executable creates the executable and signs the executable using their private key. The receiver of the executable uses the corresponding public key to verify the signature. This allows the receiver to have confidence that only someone who knows the author's private key (presumably the author) signed the executable and that the executable came from the author. Thus, the author and source of the executable are verified in part because the recipient knows the sender. In one example, the recipient only registers public keys users (such as codevelopers) that they trust. Thus, when an executable is received from a coworker and the recipient trusts that coworker, the recipient can run the executable as discussed herein.

As previously stated, operating systems may not allow a user to run executables that have no official author or source or those that came from a different computer. Even if the user is allowed to assume the risk of running the executable, the user may be unable to verify the human source of the executable. Even if an operating system accommodates a signed executable type, it is difficult for a person to verify a certificate. Further, a user may not be able to identify which executable belong to which executable. It is also inconvenient to require developers to pay for a certificate and register with a certificate authority in order to share an executable with others, such as other developers on the same development team.

In other examples, a user may run an executable in an isolated environment or container (e.g., a sandbox). The sandbox may be a lightweight version of a whole computer system, complete with an operating system, filesystem, and virtualized memory. Running the untrusted executable in the container may allow the receiver to determine whether the executable (or portions thereof) is malicious. If the executable is malicious or untrustworthy, the entire container can be stopped and deleted with minimal impact on the client's computing device or system. However, creating a container or sandbox is not convenient or quick, particularly for non-technical users.

Embodiments of the invention relate to addressing these concerns such that users can execute executables, including executables that may come from users that are personally known to the recipient without having to rely on a certificate authority or a certificate. This allows developers, including non-technical users, to develop and share executables without being burdened by the certificate process and the certificate cost. Although embodiments are discussed in the context of executables, embodiments of the invention apply to other data or file types. This may also allow a user to open a word processing document, a spreadsheet, a pdf, or the like. This allows users to share files based on personal relationships and personal trust.

FIG. 1 discloses aspects of a trust engine. A trust engine 102 is an example of an application configured to share an executable that may be installed on a client 112 and that may have been authored by a user 102a. The client 112 may be a physical machine, a virtual machine, a container, or the like and may include processors, storage and other memory, networking hardware and the like, whether real or virtual. The client 112 may be associated with the user 102a.

The trust engine 102 is configured to share an executable (or other data) in a trusted manner. Sharing an executable may include sending the executable to another trust engine or receiving an executable from another trust engine. Thus, the trust engine 102 may function as a sending trust engine and/or a receiving trust engine depending on context.

The trust engine 102 may be an application that is trusted. More specifically, the trust engine 102 may have a certificate from a certificate authority that allows the trust engine 102 to be verified by the certificate authority or other entity that is trusted by the operating system of the client 112. Thus, the trust engine 102 can be installed and executed on clients such as the client 112. Execution of the trust engine 102 is trusted and the operating system will not prevent the operation thereof.

The trust engine 202 may include a key engine 204 and/or a sharing engine 206. The key engine 204 allows a user 102a to obtain or create a key pair 118 for signing purposes. The key pair 118 may include a private key 108 and a public key 110. The private key 108 is kept secret by the user 102a and is used to sign executables the user 102a desires to share with others. The public key 110 allows receiving trust engines to verify the signed executables received from a sending trust engine. The trust engine 102 may function as a receiving and/or a sending trust engine. The public key 110 is typically registered at receiving trust engines and associated with the corresponding owner. When a signed executable can be verified with the public key that is registered to a known person, the executable may be trusted by the recipient based on the personal relationship.

The key engine 104 may also distribute keys as necessary. For example, the key engine 104 may distribute the public key 110 to other clients or other trust engines. Trust engines associated with users that do not develop executables or that do not plan on sending executables to other trust engines are not required to generate or create a key pair and may only receive public keys of other trust engines. When a public key 110 is received, the key 110 is registered at the receiving trust engine.

The sharing engine 106 is configured to perform a sharing operation. The sharing operation may assume that the key pair 118 has already been generated. The trust engine 104 takes an executable 114 and performs a sharing operation. The sharing operation assumes that the executable 114 is available. For example, the executable 114 may be a script or may be complied source code. The user 102a may identify the executable 114 in a user interface for example. The user 102a may drag and drop the executable 114 into the sharing engine 106 while specifying an intended recipient or recipients.

During the sharing operation, the sharing engine 106 may create a hash of the executable 114. The sharing engine 106 may then sign, using the private key 108, both the executable 114 and the hash to generate a signed executable 116. The signed executable 116 may then be transmitted to a receiving trust engine.

Figure 2:
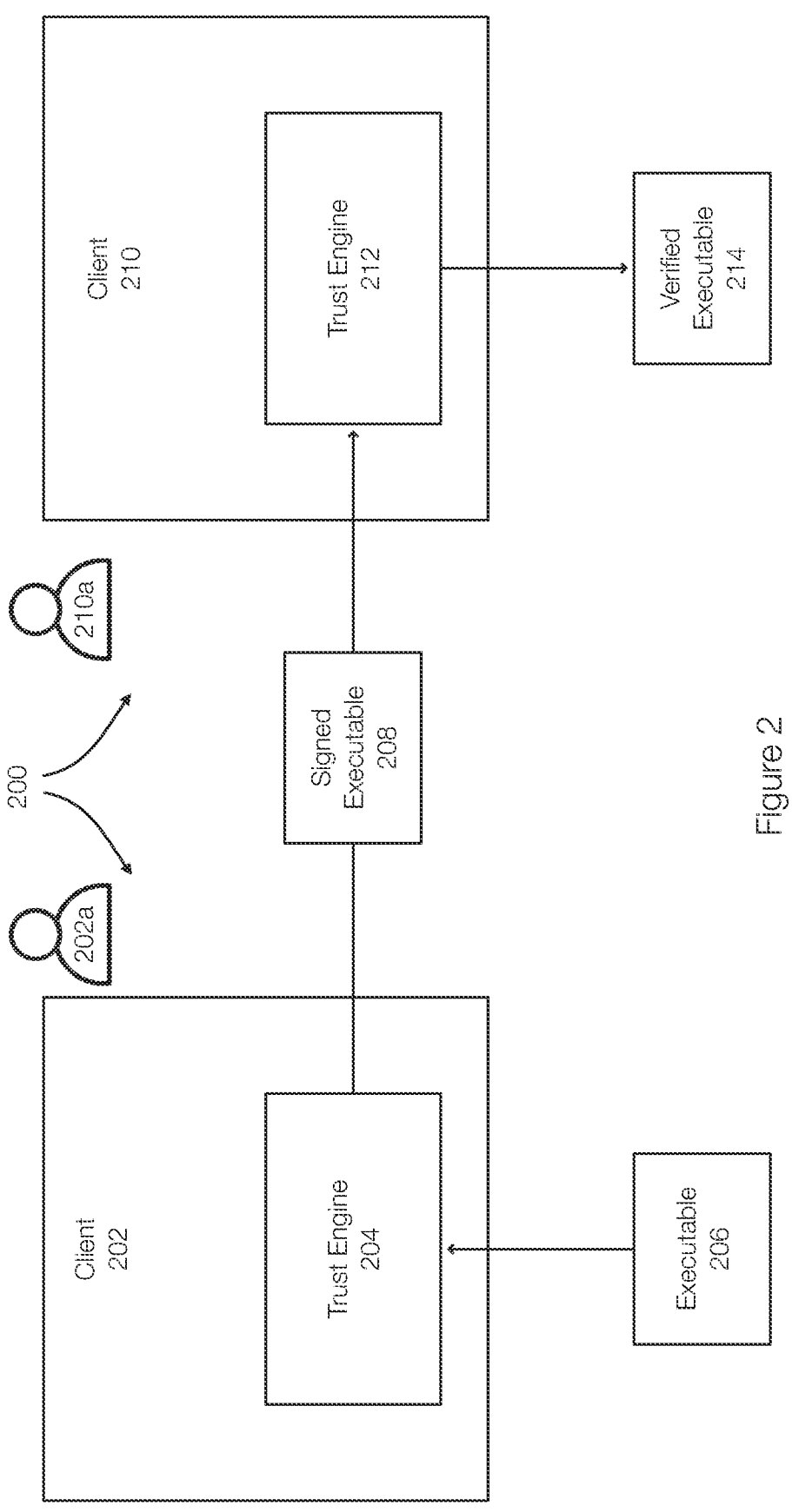
FIG. 2 discloses aspects of sharing an executable using instances of a trust engine.

FIG. 2 discloses additional aspects of sharing executables by trust engines (or by users). The system 200 may include multiple clients, represented by the clients 202 and 210, which are examples of the client 112. The clients 202 and 210 may communicate over a wired and/or wireless connection and may be connected to the same or different networks. The client 202 and 210, for example, may be part of the same local area network and may be associated with users 202a and 210a. The users 202a and 210a may be developers on the same development team or part of the same entity, have an existing relationship such that the users 202a and 210a are known to each other, or the like.

A trust engine 204 and a trust engine 212, which are examples of the trust engine 102, may be running or instantiated on, respectively, the client 202 and 210. The trust engines 204 and 212 may be different instances of the same application. In this example, the trust engine 204 is a sending trust engine 204 and the trust engine 212 is a receiving trust engine 212 because the trust engine 204 is sharing the executable 206 with the client 212.

More specifically in this example, the user 202a may develop an executable 206. The executable 206 may be compiled from source code written by the user 202a. Thus, the user 202a is the author or source of the executable 206. The trust engine 204 takes the executable 206 and generates a signed executable 208 using a private key of the user 202a. The trust engine 212 receives the signed executable and performs a receiving operation. During the receiving operation, the signed executable 208 is verified using the public key of the user 202a that was previously received at the client 210 and associated with the user 210a. The trust engine 212 then generates a hash of the executable and compares that hash to the hash included in the signed executable 208. If the two hashes match, the user 210a knows that the user 202a is the author of the executable 206. As a result, the verified executable 214 may be executed on the client 210.

The system 200 allows an executable 206 to be transmitted from a client 202 (or user 202a) to a client 210 (or user 210a) and executed without requiring the executable 206 to go through a certification process and without receiving or requiring a certificate from a certificate authority. The use of a key pair allows a personal connection between the users 202a and 210a to user-verify of the executable 206. Because the users 202a and 210a know each other (e.g., codevelopers or co-employees) and because the user 210a has the public key associated with the private key of the user 202a, the executable 206 can be run on the client 210 as the verified executable 214 if the hashes match.

For example, if the client 202 sent the executable 206 outside of or without using the trust engine 204, the operating system on the client 210 would flag the executable 206 as untrusted and may prevent the executable 206 from executing on the client 210. However, the trust engine 212 is a trusted application and can, as a result, launch the verified executable 214.

FIG. 2 thus illustrates an example of a user-trusted execution environment where verification or validation of a signed executable is based on a relationship or trust between the users 202a and 210a.

Figure 3:
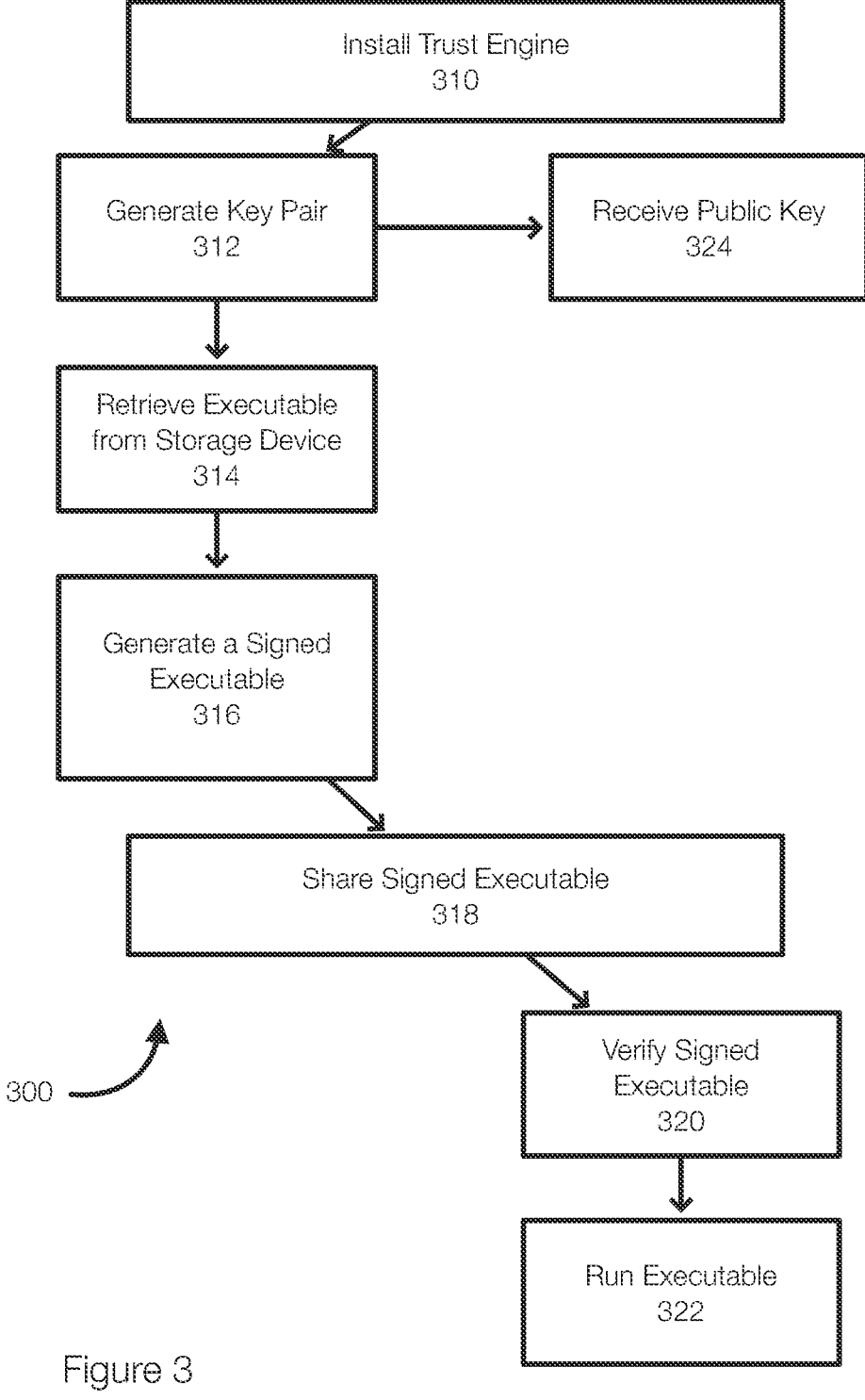
FIG. 3 discloses aspects of sharing an executable.

FIG. 3 discloses aspects of sharing an executable. The method 300 may begin by installing 310 a trust engine on a set of clients. In one example, the trust engine may be installed by each user of a group of users where each member personally knows the other members of the group (e.g., a development team, employees an entity, a group of friends) or the like. However, the trust engine can be installed on any client and the user of that client will be able to run executables received from any other user based on, by way of example, a personal relationship. If the receiving user has not received and registered a public key, then the trust engine will not be able to share the executable. Thus, because the public keys registered at the trust engine may include public keys from users known to the receiving user, the user-trust can be used to verify an executable.

Once installed, the trust engines that may act as sending trust engines generate 312 key pairs. The public keys are then distributed to other clients or users and are received 324 by other trust engines operating on other clients. Typically, a user may only share their public key with specific users that are known. The public keys, once generated or received by the receiving trust engines, are loaded and registered in the trust engines to the person that sent the keys. Thus, if the user 210a receives a public key from the user 202a, that public key is loaded into the trust engine 212 (or more specifically the key engine) and registered as pertaining to the user 202a.

This aspect of the method 300 may occur less frequently than other aspects of the method 300. Once the keys are generated and registered, the trust engines installed at the clients may perform sharing operations. A sharing operation may begin when a sending trust engine creates or retrieves 314 an executable. The sending trust engine then generates, using a private key, a signed executable that includes the executable and a hash of the executable in encrypted or signed form. The signed executable is then shared 318 to one or more receiving trust engines. The signed executable can be shared using a shared folder, using email, using a removable drive, using cloud storage, or the like.

The receiving trust engine then verifies 320 the signed executable. This includes using the public key of the sending trust engine (or sending user) to retrieve the hash and the unsigned executable, generating a hash of the executable and determining that the hashes match. If verification is successful (e.g., the public key of a user known to the receiving user can verify the signed executable, which may include verifying the hash), the executable is effectively verified by the users' relationship. Further, because this occurred inside a trusted application (the trust engine), the executable can be run 322 or launched on the receiving client.

Figure 4:
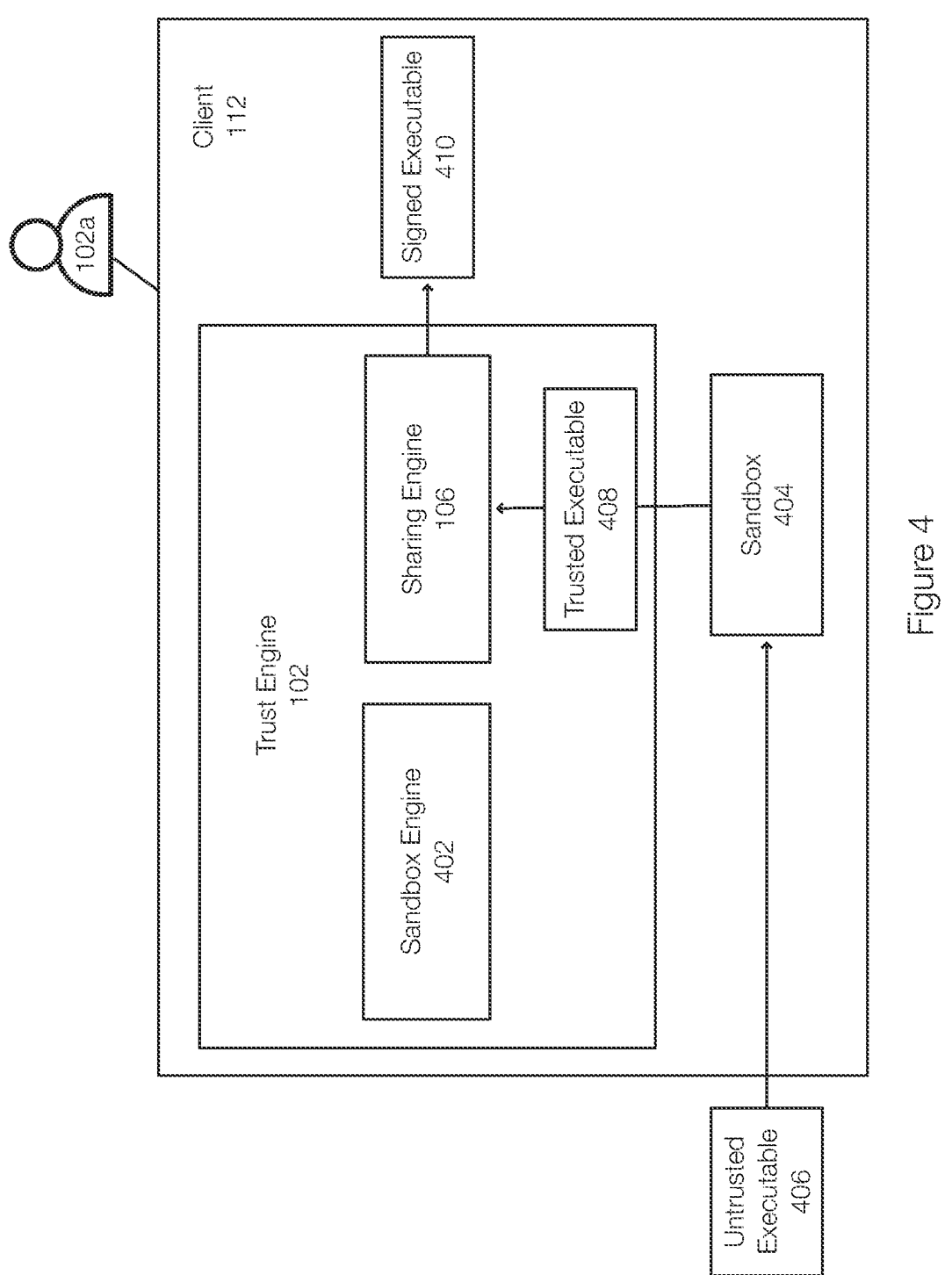
FIG. 4 discloses additional aspects of a trust engine.

FIG. 4 discloses additional aspects of a trust engine. In this example, an untrusted (and/or unsigned) executable 406 may be received at the client 112 (e.g., an administrator's client or server). The trust engine 102 in FIG. 4 (also illustrated in FIG. 1) may also include a sandbox engine 402. The sandbox engine 402 may be configured to generate a container (e.g., the sandbox 404) that substantially matches the environment of the client 112 or of another client in the system that may need or desire to run the untrusted executable 406.

In this example, the untrusted executable 404 is allowed to run in the sandbox 404. The user 102a and/or other monitoring software may evaluate the untrusted executable 406 operating in the sandbox 404. If the user 102a and/or the monitoring software determines that the untrusted executable is trustworthy, the user may attest to that verification by using the sharing engine 106 to share the untrusted executable 406 as a trusted executable 408. Thus, any user that has the public key of the user 102a (e.g., the tester or an administrator) can process the signed executable 410 as disclosed herein and execute the executable 406 on their corresponding clients. Thus, the user 102a, after testing the executable 406 in a sandbox, is essentially treating the executable 406 as if it were developed by the user 102a. If the user 102a deems the untrusted executable 406 to be untrustworthy, the user 102a will not share the executable 406 and may delete the sandbox 404.

In one example, the signed executable includes a hash and an executable. The hash and the executable may be encrypted or signed with the private key. Alternatively, only the hash is encrypted or signed with the private key. If only the hash is encrypted, this allows the public key to be used to decrypt the encrypted hash, generate a hash of the executable included in the signed executable and determine whether the decrypted hash matches the generated hash.

If the executable 406 is trusted and is signed by the sharing engine 106 using the private key of the user 102a, any client or user with the corresponding public key can run the executable 408 in a normal environment (e.g., outside of a sandbox).

Figure 5:
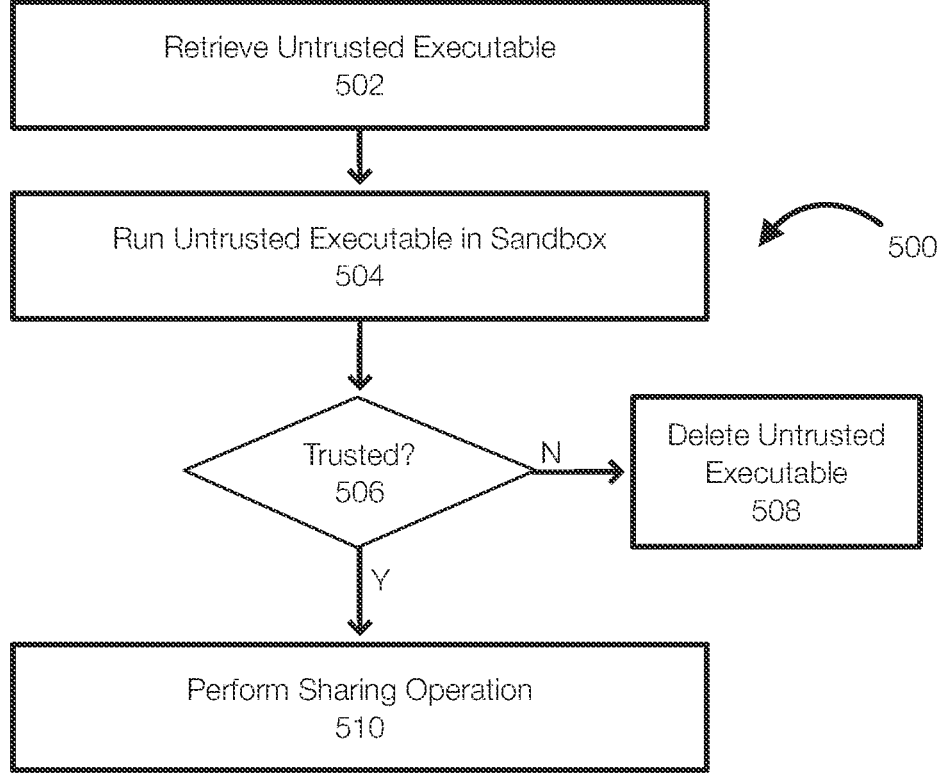
FIG. 5 discloses aspects of sharing an untrusted executable.

FIG. 5 discloses aspects of sharing an untrusted executable. In this example method 500, an untrusted executable is received 502 or received. The untrusted executable may be installed and run 504 in a container, such as a sandbox. If the untrusted executable is trusted after being evaluated in the sandbox (Y at 506), the untrusted application may be shared 510 using a sharing operation as previously described. If the untrusted executable is not trusted (N at 506), the untrusted executable and/or the sandbox may be deleted 508.

Embodiments of the invention allow executables to be signed and shared among peers. This allows, for example, developers to share their code (executables) with other developers that are known to the sharing developer. Cryptographic or signing keys can be generated and shared with known users or peers. Executables can be signed so that other users can verify the source and validity of the shared filed based on the users' relationship. This is distinct from widely published applications that are registered with certificate authorities and that rely on certificates. In embodiments of the invention, the source/author of a file can be verified without a certificate authority.

Embodiments of the invention further simplify the sandboxing needed for testing untrusted executables separately from a user's desktop or client. By running the executable in a controlled environment, the user can make an informed decision concerning the application. The executable can be monitored, and the test can be logged. If trusted, the executable can be shared in a trusted manner.

Further, this allows an IT administrator to inform employees, for example, of whether certain software or executables can be trusted. The administrator can share the executable with employees as discussed herein. Further, this allows a group of known users (known to each other) to more efficiently share scripts or other useful executables. A user of an unverified application can convey that certain executables are trusted by performing or initiating a sharing operation once the unverified application is tested in a sandbox.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, verification operations, sharing operations, signing operations, cryptographic operations, hashing operations, or the like or combination thereof.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide application sharing functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. Clients may also be able to test and share unverified executables or other code in a trusted manner. Such clients may comprise physical machines, containers or virtual machines (VM).

Particularly, devices in the operating environment may take the form of software, physical machines, containers, or VMs, or any combination of these, though no particular device implementation or configuration is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: generating a hash of an executable at a sending trust engine associated with a sending user, signing the hash and the executable with a private key of the sending user to generate a signed executable, sending the signed executable to a receiving trust engine associated with a receiving user, verifying the signed executable using a public key of the sending user, generating a second hash of the executable included in the signed executable and comparing the second hash to the hash included in the signed executable, verifying the executable when the comparison of the hash and the second hash confirms that the receiving user knows the sending user, and executing the executable at a receiving client.

Embodiment 2. The method of embodiment 1, further comprising generating a key pair by the sending trust engine, wherein the key pair includes the private key and the public key.

Embodiment 3. The method of embodiment 1 and/or 2, further comprising distributing the public key to the receiving client for the receiving user.

Embodiment 4. The method of embodiment 1, 2, and/or 3, further comprising compiling source code to generate the executable.

Embodiment 5. The method of embodiment 1, 2, 3, and/or 4, wherein the executable comprises an application, a script, a binary, or machine-readable code.

Embodiment 6. The method of embodiment 1, 2, 3, 4, and/or 5, wherein the sending trust engine and the receiving trust engine are instances of a trusted application associated with a certificate issued by a certificate authority.

Embodiment 7. The method of embodiment 1, 2, 3, 4, 5, and/or 6, wherein the executable is verified without a certificate.

Embodiment 8. A method comprising: receiving an untrusted executable at a sending trust engine operating on a sending client, testing the untrusted executable in a container configured to provide a test environment that sufficiently matches an environment of the sending client, determining that the untrusted executable is trustable, signing the untrusted executable and a hash of the untrusted executable with a private key associated with a first user of the sending client to generate a signed executable, sending the signed executable to a receiving trust engine associated with a receiving user, verifying the signed executable using a public key of the sending user, generating a second hash of the executable included in the signed executable and comparing the second hash to the hash included in the signed executable, verifying the executable when the comparison of the hash and the second hash confirms that the receiving user knows the sending user, and executing the executable at a receiving client outside of the container.

Embodiment 9. The method of embodiment 8, wherein the container comprises monitoring software configured to monitor an execution of the untrusted executable.

Embodiment 10. The method of embodiment 8 and/or 9, further comprising deleting the container without executing the executable at the receiving client when the untrusted executable is not trustworthy.

Embodiment 11. The method of embodiment 8, 9, and/or 10, wherein the container comprises a sandbox.

Embodiment 12. The method of embodiment 8, 9, 10, and/or 11, wherein verifying the executable confirms that the untrusted executable has no harmful effects.

Embodiment 13. The method of embodiment 8, 9, 10, 11, and/or 12, wherein the sending trust engine and the receiving trust engine are instances of a trusted application associated with a certificate issued by a certificate authority, and wherein the untrusted executable is verified without a certificate.

Embodiment 14. A method for performing any of the operations, methods, or processes, or any portion of any of these, or any combination thereof disclosed herein.

Embodiment 15. A non-transitory storage medium having stored therein instructions that are executable by one or more hardware processors to perform operations comprising the operations of any one or more of embodiments 1-14.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
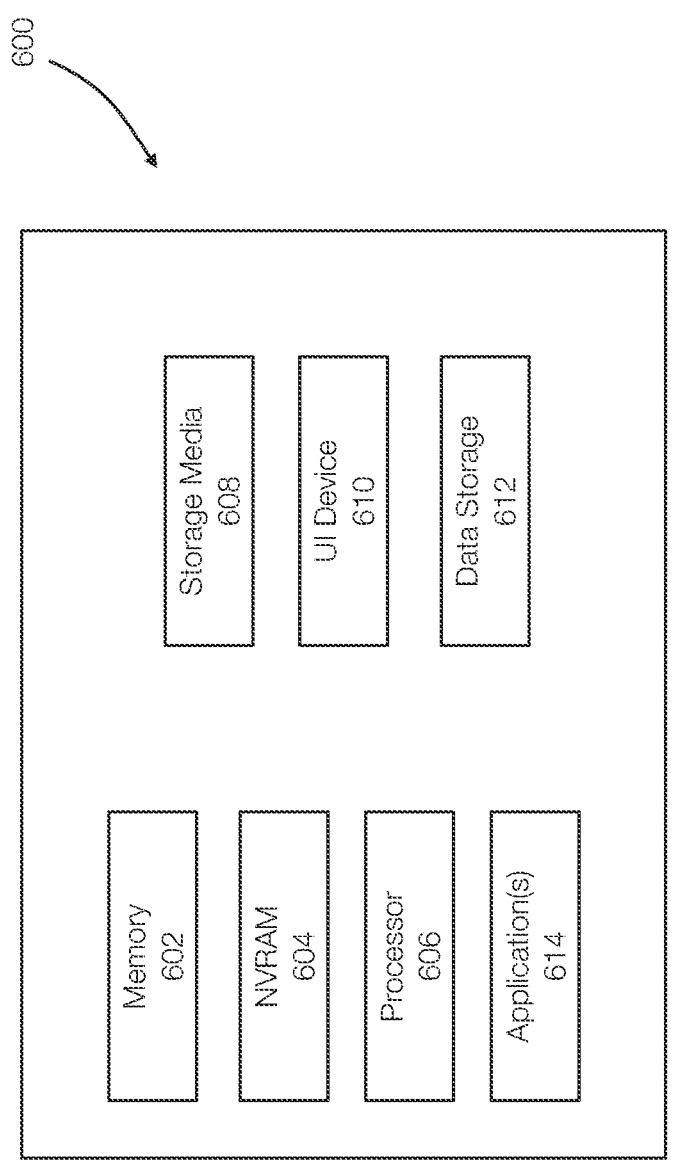
FIG. 6 discloses aspects of a computing device, system, or entity.

With reference briefly now to FIG. 6, any one or more of the entities disclosed, or implied, by the Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 912. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating a hash of an executable at a sending trust engine associated with a sending user, wherein the sending trust engine is a trusted application associated with a certificate issued a certificate authority;
signing the hash and the executable with a private key of the sending user to generate a signed executable;
sending the signed executable to a receiving trust engine associated with a receiving user, wherein the receiving trust engine is a trusted application associated with a certificate issued by a certificate authority;
verifying the signed executable using the public key of the sending user stored in the receiving trust engine, wherein the public key of the sending user is manually registered in the receiving trust engine by the receiving user;
generating a second hash of the executable included in the signed executable and comparing the second hash to the hash included in the signed executable;
verifying the executable when the second hash matches the hash included in the signed executable;
when the executable is initially untrusted, executing the executable in a sandbox environment to determine whether execution of the executable is trustworthy, and signing the executable with the private key of the sending user only upon determining that execution of the executable in the sandbox environment is trustworthy; and
executing the executable at a receiving client.

2. The method of claim 1, further comprising generating a key pair by the sending trust engine, wherein the key pair includes the private key and the public key.

3. The method of claim 2, further comprising distributing the public key to the receiving client for the receiving user.

4. The method of claim 1, further comprising compiling source code to generate the executable.

5. The method of claim 1, wherein the executable comprises an application, a script, a binary, or machine-readable code.

6. The method of claim 1, wherein the sending trust engine and the receiving trust engine are instances of a trusted application associated with a certificate issued by a certificate authority.

7. The method of claim 6, wherein the executable is verified without including a certificate in the signed executable.

8. A non-transitory storage medium having stored therein instructions that are executable by one or more hardware processors to perform operations comprising:
generating a hash of an executable at a sending trust engine associated with a sending user, wherein the sending trust engine is a trusted application associated with a certificate issued by a certificate authority;
signing the hash and the executable with a private key of the sending user to generate a signed executable;
sending the signed executable to a receiving trust engine associated with a receiving user, wherein the receiving trust engine is a trusted application associated with a certificate issued by a certificate authority;
decrypting the signed executable using the public key of the sending user stored in the receiving trust engine, wherein the public key of the sending user is manually registered in the receiving trust engine by the receiving user;
generating a second hash of the executable included in the signed executable and comparing the second hash to the hash included in the signed executable;
verifying the executable when the second hash matches the hash included in the signed executable;
when the executable is initially untrusted, executing the executable in a sandbox environment to determine whether execution of the executable is trustworthy, and signing the executable with the private key of the sending user only upon determining that execution of the executable in the sandbox environment is trustworthy; and
executing the executable at a receiving client.

9. The non-transitory storage medium of claim 8, further comprising generating a key pair by the sending trust engine, wherein the key pair includes the private key and the public key.

10. The non-transitory storage medium of claim 9, further comprising distributing the public key to the receiving client for the receiving user.

11. The non-transitory storage medium of claim 8, further comprising compiling source code to generate the executable.

12. The non-transitory storage medium of claim 8, wherein the executable comprises an application, a script, a binary, or machine-readable code.

13. The non-transitory storage medium of claim 8, wherein the sending trust engine and the receiving trust engine are instances of a trusted application associated with a certificate issued by a certificate authority.

14. The non-transitory storage medium of claim 13, wherein the executable is verified without including a certificate in the signed executable.

* * * * *